(12) United States Patent
Mumford

(10) Patent No.: US 10,865,718 B2
(45) Date of Patent: Dec. 15, 2020

(54) PRESSURE REGULATING MODULES WITH CONTROLLED LEAK PATHS

(71) Applicant: Westport Power Inc., Vancouver (CA)

(72) Inventor: David K. Mumford, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 16/083,334

(22) PCT Filed: Mar. 7, 2017

(86) PCT No.: PCT/CA2017/050308
§ 371 (c)(1),
(2) Date: Sep. 7, 2018

(87) PCT Pub. No.: WO2017/152280
PCT Pub. Date: Sep. 14, 2017

(65) Prior Publication Data
US 2019/0101070 A1    Apr. 4, 2019

Related U.S. Application Data

(60) Provisional application No. 62/304,892, filed on Mar. 7, 2016.

(51) Int. Cl.
*G05D 11/00* (2006.01)
*F02D 19/06* (2006.01)
(Continued)

(52) U.S. Cl.
CPC ..... *F02D 19/0605* (2013.01); *F02D 19/0647* (2013.01); *F02D 19/0678* (2013.01);
(Continued)

(58) Field of Classification Search
CPC ............. F16K 17/383; Y10T 137/1812; Y10T 137/261; Y10T 137/87121
(Continued)

(56) References Cited

U.S. PATENT DOCUMENTS 3,022,118 A  *  2/1962  Dobrikin ................. B60T 15/18
                                                      303/40
4,732,077 A  *  3/1988  Schweikert .......... B60G 17/052
                                                      137/116.3
(Continued)

FOREIGN PATENT DOCUMENTS

CN        102105673 A       6/2011
CN        203500630 U       3/2014
(Continued)

OTHER PUBLICATIONS

Chinese Office Action, dated Jul. 25, 2019, for Chinese Application No. 201780028155.8, 13 pages. (with English translation).
(Continued)

*Primary Examiner* — Robert K Arundale
(74) *Attorney, Agent, or Firm* — Seed IP Law Group LLP

(57) ABSTRACT

A pressure regulating module for regulating the pressure of a first fluid using a reference pressure of a second fluid. A pressure transfer assembly including a piston slidably disposed within a cylinder bore between a control fluid chamber and a reference fluid chamber is dimensioned to provide a predefined radial clearance between at least a portion of the outer side wall and the inner circumferential surface of the housing along a predefined axial length of the main body. The predefined radial clearance and predefined axial length are dimensioned to control the flow rate and amount of fluid along one or more fluid communication passages formed between at least a portion of the piston and the housing inner circumferential surface from one or more high pressure fluid zones to a lower pressure fluid zone which can include a leak and/or weep orifice directing fluid to a drain and/or vent circuit.

20 Claims, 6 Drawing Sheets

(51) Int. Cl.
    *F02M 43/00* (2006.01)
    *F16K 31/122* (2006.01)
    *F02M 21/02* (2006.01)
    *F23K 5/14* (2006.01)
    *G05D 16/10* (2006.01)
    *G05D 16/18* (2006.01)
    *F23N 1/00* (2006.01)

(52) U.S. Cl.
    CPC ......... *F02D 19/0694* (2013.01); *F02M 21/02* (2013.01); *F02M 21/0239* (2013.01); *F02M 43/00* (2013.01); *F16K 31/1221* (2013.01); *F16K 31/1223* (2013.01); *F16K 31/1225* (2013.01); *F23K 5/147* (2013.01); *F23N 1/00* (2013.01); *F23N 1/007* (2013.01); *G05D 16/107* (2019.01); *G05D 16/187* (2019.01); *F23K 2300/206* (2020.05); *Y02T 10/32* (2013.01); *Y02T 10/36* (2013.01); *Y10T 137/261* (2015.04)

(58) Field of Classification Search
    USPC ............................ 220/201; 251/63.4; 49/1, 7
    See application file for complete search history.

(56) References Cited

U.S. PATENT DOCUMENTS

| | | | |
|---|---|---|---|
| 5,704,386 | A | 1/1998 | Lehmann et al. |
| 6,298,833 | B1 | 10/2001 | Douville et al. |
| 6,463,959 | B2 | 10/2002 | Kremer |
| 7,225,830 | B1 | 6/2007 | Kershaw |
| 8,881,757 | B2 * | 11/2014 | Melcher .................. B05B 12/14 137/467.5 |
| 9,926,861 | B2 | 3/2018 | Kalenborn |
| 2003/0106584 | A1 * | 6/2003 | Neff ...................... G05D 16/107 137/116.5 |
| 2010/0147400 | A1 * | 6/2010 | Hawkins ............ G05D 16/0663 137/484.4 |
| 2010/0199948 | A1 | 8/2010 | Rogak et al. |
| 2011/0108631 | A1 | 5/2011 | Mumford et al. |
| 2014/0116520 | A1 * | 5/2014 | Puckett ............... F02D 19/0647 137/2 |

FOREIGN PATENT DOCUMENTS

| | | |
|---|---|---|
| CN | 103883742 A | 6/2014 |
| DE | 203 10 832 U1 | 12/2004 |
| DE | 10 2013 017 853 A1 | 4/2015 |
| EP | 1 338 787 B1 | 10/2006 |
| WO | 2016/197252 A1 | 12/2016 |

OTHER PUBLICATIONS

Chinese Search Report, dated Jul. 16, 2019, for International Application No. 201780028155.8, 4 pages. (with English translation).

International Search Report, dated Jun. 15, 2017, for International Application No. PCT/CA2017/050308, 3 pages.

Extended European Search Report, dated Oct. 8, 2019, for European Application No. 17762377.4-1007, 9 pages.

Communication Pursuant to Article 94(3) EPC, dated Aug. 31, 2020, for corresponding European Application No. 17 762 377.4, 6 pages.

* cited by examiner

PRESSURE REGULATING MODULES WITH CONTROLLED LEAK PATHS

FIELD OF THE INVENTION

The present disclosure relates to pressure regulating modules having controlled leak paths. More particularly to modules regulating the pressure of one fluid relative to that of another fluid in a manner designed to control the leak paths of one or more of the fluids within the pressure regulating module while maintaining a pressure bias in the system, and still more particularly, in an internal combustion engine system.

BACKGROUND OF THE INVENTION

A desire for increased fuel economy and reduced emissions has led to directed efforts in developing high pressure fuel injection systems and associated alternative fuel supply systems. Cleaner burning fuels are increasingly being used to replace more conventional diesel fuel. Alternative gaseous fuel systems deliver, for example, natural gas, pure methane, butane, propane, biogas, hydrogen, ethane and blends thereof. However, more broadly than these examples, in this disclosure "gaseous fuel" is defined as any combustible fuel that is in the gaseous phase at atmospheric pressure and ambient temperature. Since gaseous fuels typically do not auto-ignite at temperatures as low as liquid fuels, such as diesel fuel, small amounts of liquid fuel can be introduced into the combustion chamber to auto-ignite and trigger the ignition of the gaseous fuel. However developing systems that employ two or more different fuels as well as other fluids for improving combustion and emissions lead to some unique system challenges, including providing consistent and uniform fluid pressure of the two or more fluids to the engine system for reliable engine performance and emissions control. When one or more of the fluids is in gaseous rather than liquid form, the ability to control the supply pressure of the fluid to the engine system becomes more challenging and requires tighter fluid handling and control systems than needed with fluids delivered in liquid form.

Another challenge with these alternative fuel systems is keeping disparate fluids separate when delivering the two or more fluids to the engine system. Again, this is even more challenging when one or more of the fluids is in a gaseous rather than liquid form, such as when a gaseous main fuel is employed within the same injector as a liquid pilot fuel. Leakage of gaseous fuel into liquid fuel supply lines, and alternately leakage of liquid fuel into gaseous fuel supply lines, is generally undesirable and can result in poor performance including faulty injection and/or ignition problems in the engine as well as result in an increase in unburned hydrocarbon emissions.

Preventing the leakage of a gaseous fluid into liquid fluid cavities and channels of a fuel injector can be managed by maintaining the gaseous fluid pressure at a predetermined lower pressure compared to the liquid fluid pressure within the injector. This pressure differential is referred to as the bias pressure, and this bias can be maintained by a pressure regulating module which can use the liquid fluid pressure as a reference pressure to control the fluid pressure of the gaseous fluid delivered downstream of the pressure regulating module. Alternatively, the engine system can be calibrated based on a required gaseous fluid pressure and then the liquid fluid pressure can be controlled to maintain a higher pressure than the gaseous reference fluid pressure. In both alternatives, a pressure regulating module is associated with at least one of the system's fluid supplies to maintain a pressure bias between the two disparate system fluids.

Typically existing pressure regulating modules employ a pressure transfer assembly which can generally include a piston having one side in communication with a reference fluid supply pressure and another side in communication with a control fluid supply pressure. The reference fluid is employed to regulate the downstream delivery pressure of the control fluid. When liquid fluid is used as the reference fluid to regulate the delivery pressure of a gaseous fluid downstream to an end use device, the gaseous fluid is the control fluid. When gaseous fluid is used as the reference fluid to regulate the delivery pressure of a liquid fluid downstream to an end use device, the liquid fluid is the control fluid.

For direct injection of gaseous fluid in an internal combustion engine system, the fluid control system can employ a liquid fluid as the reference fluid, such as diesel, which can also be supplied to the injector as a pilot ignition fuel. Other liquid fluids can be used to provide a reference pressure including hydraulic oils or other liquid fuels that can be used as pilot ignition fuel including gasoline, dimethyl ether (DME), biodiesel, diesel fuel marine (DFM), and kerosene. Alternatively, the fluid control system can employ a gaseous fluid as the reference fluid, such as natural gas, which can also be supplied to the injector as a main fuel. In either fluid control system, it is generally desirable to control the disparate fluids such that the higher viscosity fluid is delivered to the injector of the internal combustion engine system at a higher fluid pressure than that of the lower viscosity fluid.

There are a number of ways a desired pressure bias between fluids of disparate viscosities such as a gaseous fluid and a liquid fluid can be maintained in a pressure regulating module. One way can be through the use of a differential surface area between the two sides of a piston. Another way can be through the use of one or more spring loading elements. And still another way can be through the use of a combination of differential surface area and one or more spring loading elements applied to the piston which acts as a measuring element controlling the flow of a high pressure fluid through the pressure regulating module.

Generally the piston is linked to a restricting element that controls the flow of the control fluid from a control fluid chamber to a regulated control fluid outlet of the pressure regulating module. For example, the piston can be coupled to a spring poppet valve located on the control fluid side of the piston which is exposed to a control fluid supply. The poppet valve opens when the reference fluid pressure increases on the opposite side of the piston thereby allowing a controlled fluid flow from a control fluid supply inlet to a regulated control fluid outlet. Alternate arrangements that restrict the flow of control fluid through pressure regulating modules are known; generally functioning similarly wherein a piston slides within a cylinder bore of the pressure regulating module measurably opening and closing fluid flow to the regulated control fluid outlet of the pressure regulating module. To maintain pressure within the pressure regulating module and prevent fluid leakage from the reference fluid chamber side of the piston and/or the control fluid chamber side of the piston into the opposite fluid chambers, a piston seal assembly employing o-ring style seals is used between the piston and the cylinder bore to maintain the pressure and keep the disparate fluids separate. However, these seals have been known to fail due to the dynamic pressures, fluid exposure and dynamic movement of the seals and piston within the cylinder bore allowing debris from the seals to contaminate fluid supply conduits and allowing the two disparate fluids to cross contaminate separate fluid chambers and supply conduits.

Therefore, there is a need to provide for a pressure regulating module having a more durable piston seal assembly with controlled leak paths that allow for controlled leakage of fluids such that the durability of the seals are improved and fluids do not contaminate separate fluid supply lines, all while still maintaining a desired pressure bias between the two fluids in the fluid supply system.

SUMMARY OF THE INVENTION

A pressure regulating module for regulating the pressure of a first fluid using a reference pressure of a second fluid is disclosed having a housing which includes a fluid inlet, a control fluid outlet, a reference fluid port, and at least a portion of the housing has an inner circumferential surface defining an axially extending cylinder bore. The cylinder bore is fluidly coupled to the fluid inlet on a first side of the housing and fluidly coupled to the reference fluid port on a second side of the housing. A pressure transfer assembly includes a piston slidably disposed within the cylinder bore. The piston includes a main body having a first face in communication with a control fluid chamber, a second face in communication with a reference fluid chamber, and a cylindrical outer side wall. The piston is dimensioned to provide a predefined radial clearance between at least a portion of the outer side wall and the inner circumferential surface of the housing along a predefined axial length of the main body. The predefined radial clearance and predefined axial length are dimensioned to control the flow rate of fluid along a fluid communication passage formed between at least a portion of the piston and the housing inner circumferential surface from a high pressure fluid zone to a lower pressure fluid zone. The predefined radial clearance and the predefined axial length can also be dimensioned to limit fluid flow below a predetermined amount between the high pressure fluid zone and the lower pressure fluid zone.

In some embodiments a leak orifice is provided which extends from the inner circumferential surface of the housing to an exterior surface of the housing between the reference fluid chamber and the control fluid chamber. The leak orifice can be configured to be fluidly coupled to a drain and/or vent circuit for draining fluid from the pressure regulating module to, for example, be returned via a supply line to at least one of the fluids' supply reservoirs or to one or more end use devices, such as, an internal combustion engine, an after treatment system and an auxiliary power unit. The drain and/or vent circuit can optionally include a fluid separator for separating fluids of disparate viscosities; for example when a reference fluid and a control fluid of disparate viscosity flow through the same leak orifice. A radial groove is optionally formed in the inner circumferential surface of the housing or formed in the piston main body such that the groove is in substantial alignment with the fluid leak orifice to guide fluid flowing along the fluid communication passage from a high pressure fluid zone, such as the control fluid chamber and/or the reference fluid chamber, to a lower pressure fluid zone such as the fluid leak orifice. The predefined axial length of the piston main body can extend substantially from the first face or the second face of the piston to the fluid leak orifice or alternately to the radial groove when employed in the module.

The piston may also be dimensioned to provide a second predefined radial clearance between a second portion of the piston outer side wall and a second portion of the housing's inner circumferential surface along a second predefined axial length. The second predefined radial clearance and the second predefined axial length are dimensioned to control the flow rate of fluid along a second fluid communication passage formed between the piston and the second portion of the housing's inner circumferential surface from a high pressure fluid zone to a lower pressure fluid zone. The predefined radial clearance can be substantially the same as the second predefined radial clearance or different depending on end user system requirements and the fluids being employed. The predefined axial length can extend substantially from the first face all the way to the second face of the piston, or from the first face and/or second face to the fluid leak orifice or a radial groove depending on the end user system requirements.

A leakage preventing seal may be optionally positioned in an annular groove around the piston main body to form a seal between the outer side wall of the piston and the inner circumferential surface of the housing between the leak orifice and the control fluid chamber. The annular groove can be optionally formed in the piston main body such that the seal moves slidably within the housing along with the piston, or the annular groove can be formed in the inner circumferential surface of the housing such that the seal remains in the annular groove of the housing while the piston moves slidably past the seal positioned within the housing.

In some embodiments, the pressure regulating module can be a non-relieving pressure regulating module, which when used in fluid control systems employing such disparate viscosity fluids as a gaseous fluid and a liquid fluid, can employ a separate vent valve to control the venting of the gaseous fluid elsewhere in the fluid control system. Alternatively, the pressure regulating module can optionally be a self-relieving pressure regulating module that employs a passive vent and/or weep system allowing gaseous fluid or lighter viscosity liquids in the control fluid chamber to by-pass the leakage preventing seal through a vent and/or weep passage to exit the module housing when over a maximum pressure. Exemplary fluid control systems are described in applicant's U.S. Provisional Application 62/175,157 which is incorporated by reference herein. In fluid control systems that employ a fluid separator, the passive weep and/or vent system can be integrated with the fluid leak orifice to remove weeping fluids from the module via the fluid leak orifice. In these systems, a fluid separator can then be employed to separate disparate liquid fluids and/or gaseous fluid and to direct each fluid to at least one of their respective supply reservoirs, an after treatment system, an internal combustion engine, and an auxiliary power unit. Alternatively, the pressure regulating module can optionally employ a weep passage leading to a separate fluid weep orifice that extends from the inner circumferential surface of the housing to the exterior surface of the module housing. The weep orifice may be configured to be fluidly coupled to a drain or vent circuit wherein fluid from the weep orifice is directed to at least one of a supply reservoir of the fluid, an after treatment system, an internal combustion engine, and an auxiliary power unit. The terms weep and weeping are used herein to more broadly include vent and venting respectively for expelling gaseous fluids, where appropriate, from the pressure regulating module as well as liquid fluids and mixtures therefrom.

In embodiments employing a separate fluid weep orifice from the fluid leak orifice, a second leakage preventing seal positioned in an annular groove around the piston main body between the fluid leak orifice and the fluid weep orifice can be employed to keep control fluid separate from reference fluid. Annular grooves in which the leakage preventing seals are positioned can optionally be formed in the piston main body such that the seal moves slidably within the housing along with the piston, or the annular grooves can optionally be formed in the inner circumferential surface of the module housing such that the seal remains in the annular groove of the housing while the piston moves slidably past the seal.

In some embodiments, the piston also can include an upper extended portion having an outer side wall and an upper second face. The upper extended portion is in fluid communication with the fluid leak orifice through an upper drain orifice and is dimensioned to provide a second predefined radial clearance between at least a portion of the outer side wall and a second inner circumferential surface of the housing along a second predefined axial length. The second predefined radial clearance and second predefined axial length are dimensioned to control the flow rate of fluid along a second fluid communication passage formed between the outer side wall and the second inner circumferential surface from the high pressure fluid zone of the reference fluid chamber to the lower pressure fluid zone of the upper drain orifice. The predefined radial clearance can be substantially the same as the second predefined radial clearance. Also, the upper extended portion and the main body of the piston can be separate components, and a biasing spring can also be employed to bias the separate upper extended portion to the main body of the piston.

In embodiments that do not employ a leak orifice between the reference fluid chamber and the control fluid chamber, a controlled leak path directs fluid from a higher pressure fluid zone, such as a reference fluid chamber having a higher pressure fluid therein, to a lower pressure fluid zone, such as the control chamber; thereby allowing a controlled amount of reference fluid to be entrained in the control fluid exiting the control fluid outlet of the pressure regulating control module. In this embodiment, the predefined axial length of the piston main body may extend substantially from the first face to the second face of the piston.

Depending on the end user system, reference fluid in the reference chamber and control fluid in the control chamber are substantially the same fluid. In other end user systems, reference fluid in the reference chamber and control fluid in the control chamber have disparate viscosities; for example, a liquid can be employed as the reference fluid for controlling the outlet pressure of a gaseous fluid.

The end user system can include an internal combustion engine system downstream of the pressure regulating module and the control fluid may be a liquid or gaseous fuel which is then directed to the engine. The reference fluid may be a second fuel used by the same engine or it can be another system fluid. In a preferred embodiment, a liquid reference fluid controls a gaseous fluid for injection into an engine. In another embodiment, a gaseous reference fluid controls a liquid fluid for injection into an engine.

A pressure bias between the control fluid and the reference fluid can optionally be maintained by employing a piston having a differential surface area between the two sides of the piston in contact with the control fluid chamber and the reference fluid chamber. Alternatively or in addition to employing a differential surface area, the pressure bias can optionally be maintained by employing one or more spring loading elements.

In an end user system which may include a direct injection gaseous fuelled internal combustion engine system, a pressure bias of 3 bar or greater is preferred between the reference fluid chamber and the control fluid chamber. The predefined radial clearance is preferred to be less than 0.05 mm and more preferably less than 0.005 mm and most preferably less than 0.003 mm. Additionally, the rate of fluid leaking from the housing is preferably less than 5.0 kg/hr and more preferably less than 1.0 kg/hr and most preferably less than 0.5 kg/hr.

Additional features and advantages of the invention may be understood from other sections of this disclosure by reference to the drawings, and by practicing the disclosed methods with the disclosed apparatus.

BRIEF DESCRIPTION OF THE DRAWINGS

The drawings illustrate specific preferred embodiments of the invention and are not drawn to scale and should not be considered as restricting the spirit or scope of the invention.

FIGS. 7(a, b, c, and d) are exemplary cross-sectional views of a side portion of pressure regulating module embodiments described herein illustrating optional seal arrangements.

DETAILED DESCRIPTION OF PREFERRED EMBODIMENT(S)

Throughout the following description, specific details are disclosed to provide a more thorough understanding of the invention. However, some well-known elements have not been shown or described in detail to avoid obscuring the presently disclosed invention. Accordingly, the specification and drawings are to be regarded in an illustrative, rather than restrictive, sense. All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

A pressure regulating module for controlling a first fluid supply line pressure by employing a second fluid pressure can be used in any end use device system where one fluid pressure needs to be controlled relative to another fluid pressure. For example, when an end use device is an internal combustion engine fuelled with two or more fuels, where two or more fuels are injected directly into the combustion chamber of the engine, it can be desirable to control the supply pressure of a first fuel as a function of the supply pressure of a second fuel. The supply pressure of the second fuel can be used as a reference pressure for controlling the supply pressure of the first fuel as well as for maintaining a pressure bias between the two fluids.

The embodiments disclosed herein are at times described, by way of example, in relation to gaseous fuelled internal combustion engine systems as the end use device; such as those disclosed in U.S. Pat. No. 6,298,833, which is hereby incorporated by reference herein. These internal combustion engine systems are fueled with a gaseous fuel as the main fuel; such as natural gas, and a liquid second fuel as a pilot fuel; such as diesel. However the present disclosure will be understood to apply more generally to fluid control systems where the supply pressure of one fluid is being controlled at least in part by the pressure of a reference fluid within the same module housing when it is desirable to either control the amount or entirely prevent leakage of one fluid into the other fluid chambers and supply conduits. In some applications the reference fluid may be the same as the control fluid for which it is regulating. In other applications the two fluids may be disparate, having different fluid properties.

Figure 1A:
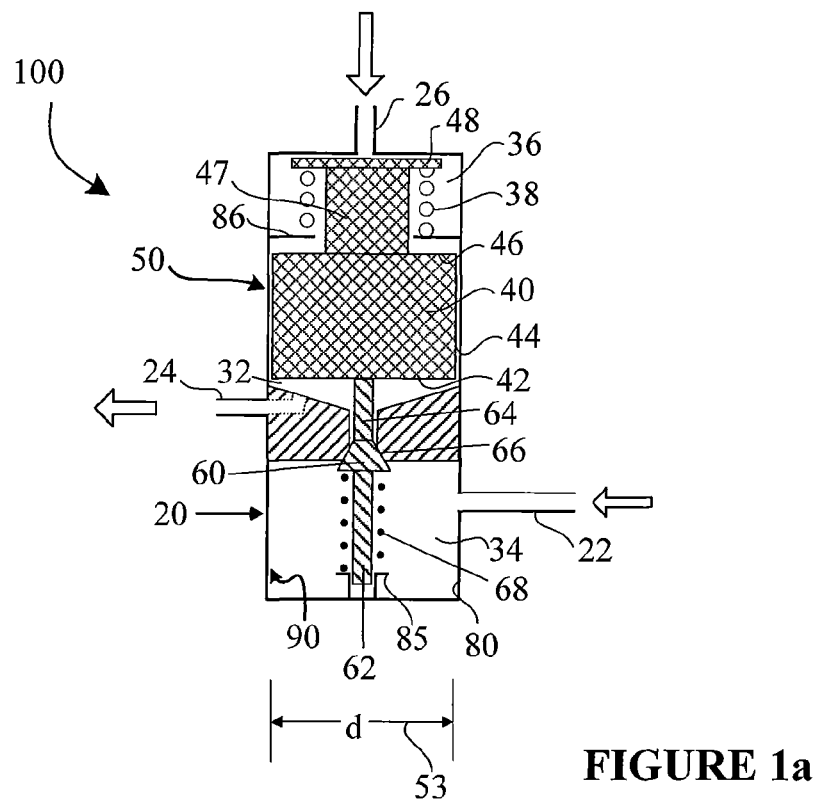
FIG. 1a is an exemplary cross-sectional schematic illustration of a pressure regulating module according to one embodiment of the present disclosure with a match-fit forming a leakage limiting fluid seal and providing a controlled leak path between a reference fluid chamber and control fluid chamber.
Figure 1B:
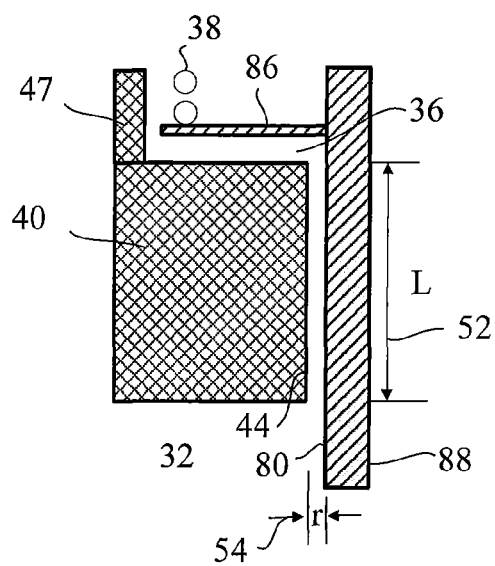
FIG. 1b is an exemplary cross-sectional view of a side portion of the pressure regulating module of FIG. 1a illustrating the match-fit having a predefined length (L) and predefined radial clearance (r) between a piston body and a cylinder wall of the module housing.

A first embodiment, as illustrated in FIGS. 1a and 1b, is directed to a pressure regulating module 100 in a fluid control system where the supply pressure of one fluid is being controlled at least in part by the pressure of a reference fluid within the same module housing. Pressure regulating module 100 can be used to regulate a control fluid; such as a gaseous fuel, against a reference fluid; such as a liquid fuel, such that the control fuel pressure is maintained at a set bias below the reference fuel pressure. This bias can be set as required for a particular system, but is generally between 3 bar and 75 bar in an internal combustion engine system injecting two or more disparate fuels into the combustion chamber of an internal combustion engine where one fuel is in gaseous form and the other fuel is in liquid form. In order to obtain the necessary pressure to overcome the pressure inside a combustion chamber of an internal combustion engine, fuel pressures generally greater than 100 bar are desired and improved performance and operation has been found for pressures greater than 350 bar.

Pressure regulating module 100 has a housing 20 which includes fluid inlet 22, control fluid outlet 24, reference fluid port 26, and axially extending cylinder bore 90 defining an inner circumferential surface 80 of the housing. Cylinder bore 90 is fluidly coupled to fluid inlet 22 on a first side of the housing and fluidly coupled to the reference fluid port 26 on a second side of the housing.

Piston 40 is slidably disposed within axially extending cylinder bore 90 and has a first face 42 in communication with a control fluid chamber 32, a second face 46 in communication with a reference fluid chamber 36, and a main body with a cylindrical outer side wall 44 which extends between the first face and the second face of piston 40. Piston 40, having a diameter "d" 53, can have an upper extended portion 47 with an end flange 48 against which biasing element 38 can press on one end and against housing retaining flange 86 on the other end, such that piston 40 is biased against reference fluid port 26 at the second side end of housing 20. At least a portion of the piston main body has an outer circumference dimensioned to provide an axially extending match-fit 50 forming a leakage limiting fluid seal along a predefined axial length of inner circumferential surface 80 of housing 20 to control fluid flow along the fluid communication passage formed between control fluid chamber 32 and reference fluid chamber 36.

Flow control valve 60 is biased against valve seat 66 by biasing element 68 which also pushes flow control upper plunger portion 64 against piston face 42. Biasing element 68, shown in FIG. 1a as a spring element surrounding flow control lower plunger portion 62, is loaded against retaining flange 85 at a first side end of housing 20. Flow control valve 60 can be a poppet valve or other suitable flow control valve that isolates control fluid chamber 32 from fluid inlet 22.

In the exemplary embodiment shown in FIG. 1a, a control fluid, such as natural gas, flows into housing 20 through fluid inlet 22 from a control fluid supply. The control fluid fills fluid entry chamber 34 and flow control valve 60 remains in a closed position against seat 66 sealing control fluid chamber 32 from fluid flowing into pressure regulating module 100 from fluid inlet 22. A reference fluid, such as diesel, flows into housing 20 through reference fluid port 26 into reference fluid chamber 36. The reference fluid pressure pushes piston 40 downward once the reference fluid pressure is greater than the set bias. Piston 40 in turn pushes down on flow control upper plunger 64 of flow control valve 60 which is in contact with piston first face 42. Flow control valve 60 is thereby opened against seat 66 allowing fluid to flow from fluid entry chamber 34 to control fluid chamber 32 and out housing 20 through control fluid outlet 24. The combination of fluid forces and spring forces creates the regulated flow through seat 66 so that the downstream control fluid pressure (such as a gas rail pressure) is at a set bias below the downstream reference fluid pressure (such as a diesel rail pressure). While the exemplary embodiments shown herein show a single reference fluid port 26 which can allow the reference fluid to flow in and out of housing 20 via the same orifice, fluid port 26 can also be configured with a reference fluid inlet separate from a reference fluid outlet.

Referring now to FIG. 1b, in order to control and direct fluid leakage along a controlled leak path, piston 40 is dimensioned to provide a predefined radial clearance "r" between at least a portion of outer side wall 44 and inner circumferential surface 80 of the housing along a predefined axial length "L" of the piston main body. The predefined radial clearance "r" between at least a portion of outer side wall 44 and inner circumferential surface 80 of housing 20, together with the predefined axial length "L" of the predefined radial clearance portion of outer side wall 44 for a give piston diameter is also referred to herein as a match-fit. FIG. 1b shows an exemplary cross-sectional view of a side portion of a pressure regulating module illustrating a match-fit having predefined axial length 52 (denoted by "L") and predefined radial clearance 54 (denoted by "r"). When the fluid pressure in reference fluid chamber 36 is biased higher than the fluid pressure in control fluid chamber 32, fluid generally flows along a controlled leak passage formed between the piston and the inner circumferential surface of the housing from the high pressure fluid zone (upper reference fluid chamber 36) toward the lower pressure fluid zone (control fluid chamber 32). Therefore a controlled portion of reference fluid flows downward along match-fit 50 from the reference fluid chamber 36 towards the control fluid chamber 32 to be mixed with the control fluid and then directed downstream through control fluid outlet 24 to an end use device. For systems using the same fluid for both a reference pressure fluid and a regulated pressure fluid, a controlled amount of leakage of fluid from the reference chamber to the control chamber may be acceptable as long as the overall system operation is not compromised. For other systems, including some engine injection systems, a controlled amount of disparate reference fluid being entrained in the control fluid is desirable. For example a controlled amount of diesel (as the reference fluid) entrained in natural gas (as the control fluid) can improve the life of some injectors through a lubrication effect. However in many engine injection systems, it is highly desirable to control the injection timing of a first fuel separate from the injection timing of a second fuel for improved performance and enhanced emissions. In these systems and others where it is desirable to keep the reference fluid separate from the control fluid, one or more controlled leak paths can be employed to direct fluid from one or more high pressure fluid zones (fluid chambers 32, 36) to one or more lower pressure fluid zones formed in the inner circumferential surface 80 of housing 20 between fluid chambers 32 and 36, which can then direct fluid to the outside of the pressure regulator housing.

Figure 2A:
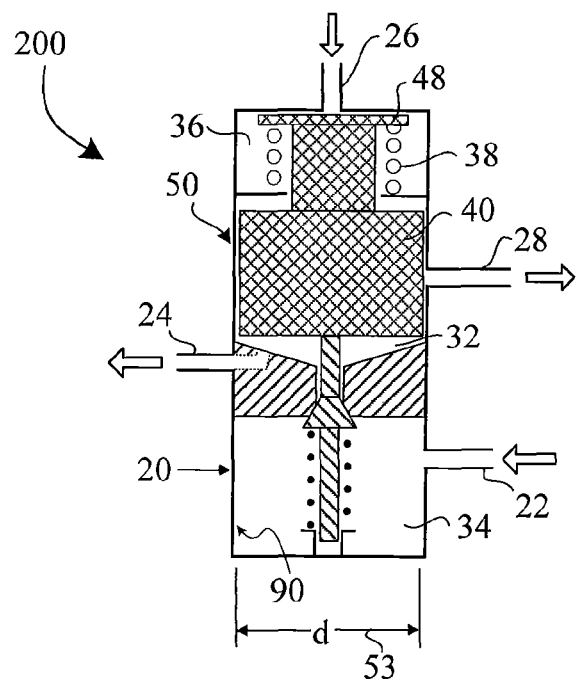
FIG. 2a is an exemplary cross-sectional schematic illustration of a pressure regulating module according to another embodiment of the present disclosure having a fluid leak orifice between the reference fluid and control fluid chambers.

FIG. 2a is one such alternative embodiment, showing pressure regulating module 200 with a controlled leak path to a drain or leak orifice. Elements in common with earlier described embodiments are referenced by the same reference numbers herein, and if they operate and function in the same way, may not be described again in relation to each embodiment. In the exemplary embodiment shown in FIG. 2a, a fluid leak orifice 28 (also referred to as a drain orifice herein) is provided between reference chamber 36 and control fluid chamber 32 to direct fluid flowing along the length of tightly controlled match-fit 50 out of module housing 20 rather than allowing fluid to flow between reference fluid chamber 36 and control fluid chamber 32. Fluid leak orifice 28 is fluidly connected with cylinder bore 90 and extends from the inner circumferential surface 80 to exterior surface 88 of housing 20. Fluid leak orifice 28 can be fluidly coupled to a drain circuit for draining the fluid from the pressure regulating module to, for example, be returned to the fluid's supply reservoir or to an end use device, such as, an internal combustion engine, an after treatment system or an auxiliary power unit. During operation, both the fluid pressure in reference fluid chamber 36 and the fluid pressure in control fluid chamber 32, are higher fluid pressure zones compared to the lower fluid pressure zone along the controlled leak path which includes one or more match-fits formed between piston 40 and inner circumferential surface 80 of housing 20. Therefore fluid generally flows from the higher pressure fluid zone of reference fluid chamber 36 downward towards the lower pressure fluid zone of fluid leak orifice 28; and from the higher pressure fluid zone of control fluid chamber 32 upward, also towards the lower pressure fluid zone of fluid leak orifice 28.

Figure 2B:
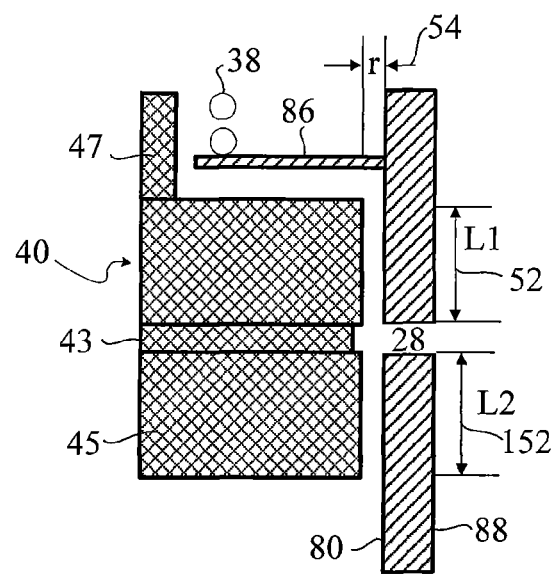
FIG. 2b is an exemplary cross-sectional view of a side portion of the pressure regulating module of FIG. 2a illustrating two controlled match-fits each having a predefined axial length (L1, L2) and each having a predefined radial clearance (r1, r2) between a piston body and a cylinder wall of the module housing. A first predefined length (L1) extends along a portion of piston 40 between the leak orifice and the reference fluid chamber and a second predefined length (L2) extends along another portion of piston 40 between the leak orifice and the control fluid chamber.

FIG. 2b is an exemplary cross-sectional view of a side portion of pressure regulating module 200 of FIG. 2a illustrating two separate match-fits each having a predefined axial length 52, 152 (denoted by "L1" and "L2" respectively) and each having a predefined radial clearance 54 (denoted by "r") between a portion of cylindrical outer wall 44 of piston 40 and inner circumferential surface 80 of housing 20. As shown in FIG. 2b, a portion of the outer circumference of piston 40 can optionally include a radial groove 43 such that it is in substantial alignment with fluid leak orifice 28 to act as an additional guide for fluid flowing from higher pressure fluid zones, reference fluid chamber 36 and/or control fluid chamber 32, to a lower pressure fluid zone such as leak orifice 28. Alternatively a radial groove can be formed in the inner circumferential surface of housing 20. Lower extended portion 45 of piston 40 can have a different predefined radial clearance "r" to that of the upper extended portion of piston 40 allowing for a differential leakage rate or for balancing the leakage rate of the reference and control fluids. A portion of piston 40 may have a relaxed radial tolerance which is greater than any predefined radial clearance portion of the piston. The match-fit diameter 53 of piston 40 (denoted by "d" in FIG. 2a) is therefore sized to cylinder bore 90 diameter to provide a predefined radial clearance 54 along a match-fit length 52, 152, while other portions of piston 40 can have a smaller diameter depending on the end use system requirements.

The embodiment illustrated in FIGS. 2a and 2b employs a match-fit which controls fluid flow along a fluid communication passage formed between piston 40 and inner circumferential surface 80 along predefined axial length 152 to fluid leak orifice 28. In order to prevent any flow from the control fluid chamber 32 to fluid leak orifice 28, a leakage preventing seal is required between the control fluid chamber 32 and fluid leak orifice 28. Potential seals include, but are not limited to, o-rings, lip seals and energized seals. These seals need to provide a reliable and consistent seal with good wear resistance and low friction. The seals should also be able to withstand rapid depressurization, particularly when gaseous fluids are employed.

Figure 3:
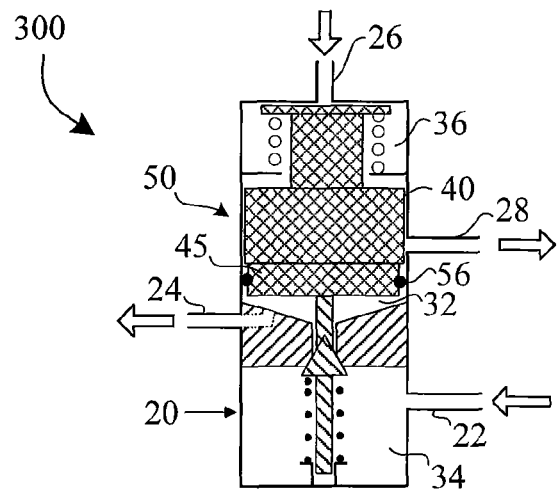
FIG. 3 is an exemplary cross-sectional schematic illustration of a pressure regulating module according to another embodiment of the present disclosure having a leakage preventing seal between the control fluid chamber and a fluid leak orifice such that only the reference fluid leaks from the module through the fluid leak orifice.

Referring to FIG. 3, another exemplary embodiment of a pressure regulating module 300 is disclosed. In this alternate embodiment, a leakage preventing seal 56 is disposed between control fluid chamber 32 and fluid leak orifice 28. Leakage preventing seal 56 can be positioned in an annular groove or recess formed in the lower extended portion 45 of piston 40. Alternately, leakage preventing seal 56 can be positioned in an annular groove or recess formed in the inner circumferential surface 80 of housing 20. Leakage preventing seal 56 keeps control fluid in control fluid chamber 32 sealed off from flowing to fluid leak orifice 28. As illustrated in the exemplary embodiment shown in FIG. 2b, a portion of the outer circumference of piston 40 can optionally include groove 43 to act as an additional guide for fluid flowing from higher pressure fluid zone of the reference fluid chamber 36 to lower pressure fluid zone of the leak orifice 28.

In particularly high pressure fluid control systems, a control fluid weep or vent valve, separate from pressure regulating module 300, can optionally be employed in an end use fluid control system if desired allowing weeping and/or venting of control fluid from the fluid control system. Venting and/or weeping of control fluid might be desired for instance when the system is shut down under pressure and in need of servicing. Another example might be when the control fluid pressure rises in the supply system above a predetermined safety pressure.

Figure 4:
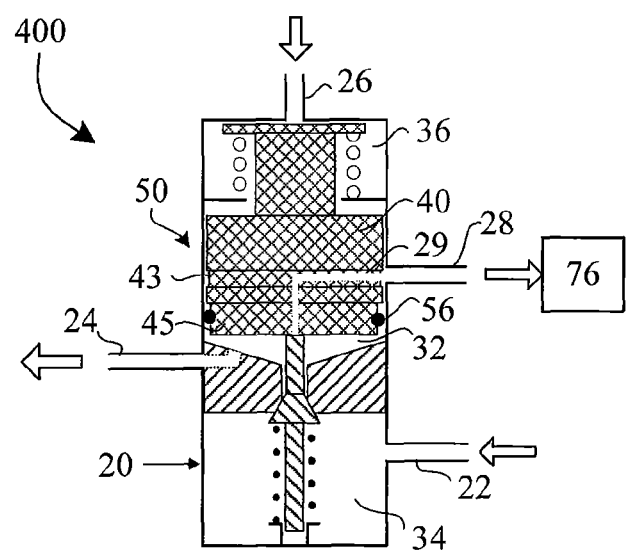
FIG. 4 is an exemplary cross-sectional schematic illustration of a pressure regulating module according to another embodiment of the present disclosure having a weep passage in the piston body for controlled venting and/or weeping of control fluid out of the module through a fluid leak orifice.
Figure 5:
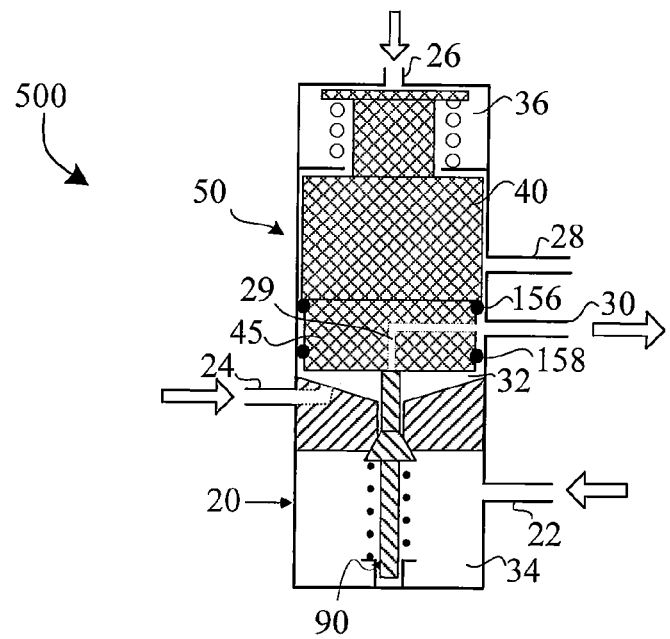
FIG. 5 is an exemplary cross-sectional schematic illustration of a pressure regulating module according to another embodiment of the present disclosure including a weep passage in the piston body for venting and/or weeping of control fluid from the module through a weep orifice which is separate from a fluid leak orifice.

Instead of necessitating a separate vent valve, it can be advantageous in certain end use fluid control systems to integrate a weeping and/or venting component in the fluid control module such as the exemplary embodiments shown in FIGS. 4 and 5.

FIG. 4 illustrates an exemplary cross-sectional schematic of a pressure regulating module 400 according to another embodiment of the present disclosure. Again, elements in common with earlier described embodiments are referenced by the same reference numbers and if they operate and function in the same way, may not be described again in relation to other embodiments herein. In this alternate embodiment, a weep passage 29, which can also be used as a vent passage for gaseous fluids, is formed in the main body of piston 40; and fluidly connects control fluid chamber 32 to fluid leak orifice 28 for weeping control fluid out of housing 20 through fluid leak orifice 28. In some fluid control systems, fluid pressure downstream of pressure regulating module 400 may raise the pressure in control fluid chamber 32 above a predetermined pressure. When this occurs, upper plunger portion 64 separates from piston first face 42 allowing for a controlled weep path from control fluid chamber 32 through weep passage 29 and out of housing 20 through fluid leak orifice 28 which can be fluidly coupled to a drain circuit. A fluid separator 76 can be employed to separate liquids of disparate viscosities, or in the case of gaseous fluid, fluid separator 76 may be a gas vent separator used to separate gaseous vented fluids from any liquid fluid that leaks down a match-fit to leak orifice 28. The fluids can then be returned to each fluid's supply reservoir or alternatively one or more fluid can be directed to a drain or vent circuit which supplies the fluid to an end use device, such as, an internal combustion engine, an after treatment system or an auxiliary power unit. Fluid separator 76 can also include a pump, which in operation, creates an even lower pressure fluid zone at leak orifice 28. A portion of the outer circumference of piston 40 can also optionally include groove 43 to act as an additional guide for fluid flowing from higher pressure fluid zone of the reference fluid chamber 36 or weep passage 29 to lower pressure fluid zone of the leak orifice 28.

FIG. 5 illustrates an exemplary cross-sectional schematic of a pressure regulating module 500 according to another embodiment of the present disclosure. In this alternate embodiment, weep passage 29 (which can also be used as a vent passage for gaseous fluids) is formed in the main body of piston 40 and fluidly connects control fluid chamber 32 to weep orifice 30 to allow control fluid a flow path out of housing 20 through a dedicated control fluid weep path. When employing a separate fluid weep orifice 30 along with fluid leak orifice 28, first and second leakage preventing seals, 156 and 158 respectively, may be employed to isolate weep orifice 30 to keep any control fluid weeping from weep passage 29 to weep orifice 30 separate from any reference fluid flowing to leak orifice 28. It can be advantageous in some fluid control systems to employ pressure regulating module 500 having control fluid weep orifice 30 separate from fluid leak orifice 28 so that, for example, the two fluids can be returned to their separate fluid supply subsystems via a drain or vent circuit without the need of a fluid separator and then the fluid can be directed to at least one of a fluid's supply reservoir, an after treatment system, internal combustion engine and power auxiliary unit depending on the system requirements. Again, as illustrated in the exemplary embodiment shown in FIG. 2b and FIG. 4, a portion of the outer circumference of piston 40 can also optionally include groove 43 to act as an additional guide for fluid flowing from higher pressure fluid zone of the reference fluid chamber 36 to lower pressure fluid zone of the leak orifice 28.

Figure 6:
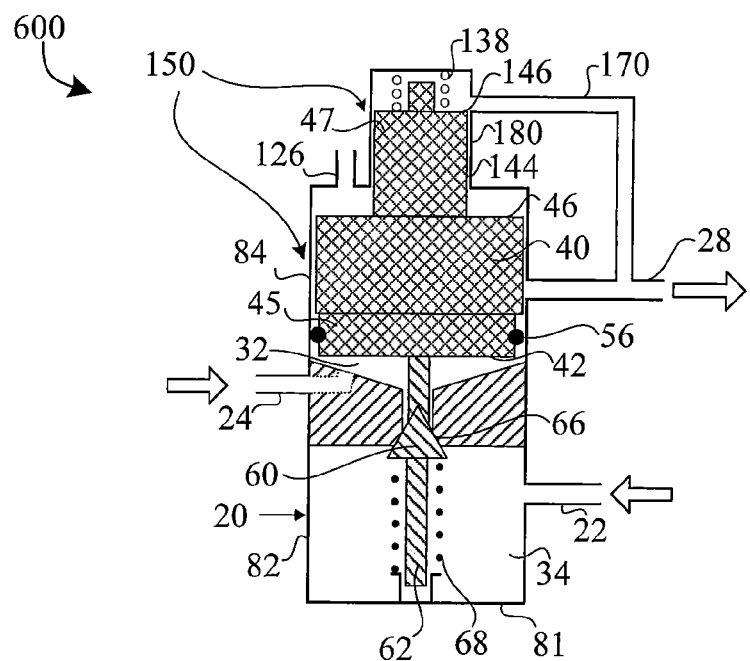
FIG. 6 is an exemplary cross-sectional schematic illustration of a pressure regulating module according to another embodiment of the present disclosure which uses a piston differential surface area on the upper reference fluid piston face rather than a spring element to maintain a bias between the reference fluid and the control fluid.

FIG. 6 illustrates an exemplary cross-sectional schematic of a pressure regulating module 600 according to another embodiment of the present disclosure. In this alternate embodiment there is no upper biasing element, like spring 38 shown in FIGS. 1-5. Instead, the bias is set by a differential surface area on the second face 46 of piston 40 compared to that of the first face 42 of piston 40. The piston 40 has an upper extended portion 47 having an outer side wall 144 and an upper second face 146. The upper extend portion is in fluid communication with the fluid leak orifice 28 through an upper drain orifice 170 and is dimensioned to provide a second predefined radial clearance between at least a portion of outer side wall 144 and a second inner circumferential surface 180 of said housing along a second predefined axial length; such that the second predefined radial clearance and second predefined axial length are dimensioned to control the flow rate of fluid along a second fluid communication passage formed between outer side wall 144 and the second inner circumferential surface 180 from high pressure fluid zone of the reference fluid chamber 36 to lower pressure fluid zone of the upper drain orifice 170. The reference fluid leak paths are controlled by two match-fits 150 which each form a leakage limiting fluid seal rather than a single match-fit. Upper reference fluid drain orifice 170 directs reference fluid along the upper match-fit so as to avoid having a trapped volume of fluid above upper second face 146 of piston 40. Upper reference fluid drain orifice 170 is fluidly connected to fluid leak orifice 28 where fluid can be directed out of housing 20. A leakage preventing seal (not shown) can be employed with upper second face 146 to alleviate the need for a precise concentric match-fit between a second predefined radial clearance of upper extended portion 47 and the predefined radial clearance of main body portion of piston 40. As with all the exemplary embodiments herein the match-fits can have different predefined radial clearances and different predefined axial lengths depending on the application. Again, a portion of the outer circumference of piston 40 can also optionally include groove 43 to act as an additional guide for fluid flowing from higher pressure fluid zone of the reference fluid chamber 36 to lower pressure fluid zone of the leak orifice 28. Piston 40 may be a single component or an assembly of modular components working together, for example, the main body of piston 40 may be a separate component from upper extended portion 47; in this instance, biasing element 138 may be employed above the upper extended portion 47 to maintain contact between the two piston portions while in operation.

FIGS. 7(a, b, c and d) are exemplary cross-sectional views of a side portion of pressure regulating module embodiments described herein illustrating optional leakage preventing seal arrangements. Such seals can include, but are not limited to, o-rings, lip seals and energized seals and are selected based on the requirements of the system in which the module is employed. These seals need to provide a reliable and consistent seal with good wear resistance and low friction. The seals should also be able to withstand rapid depressurization, particularly when gaseous fluids are employed.

Figure 7A:
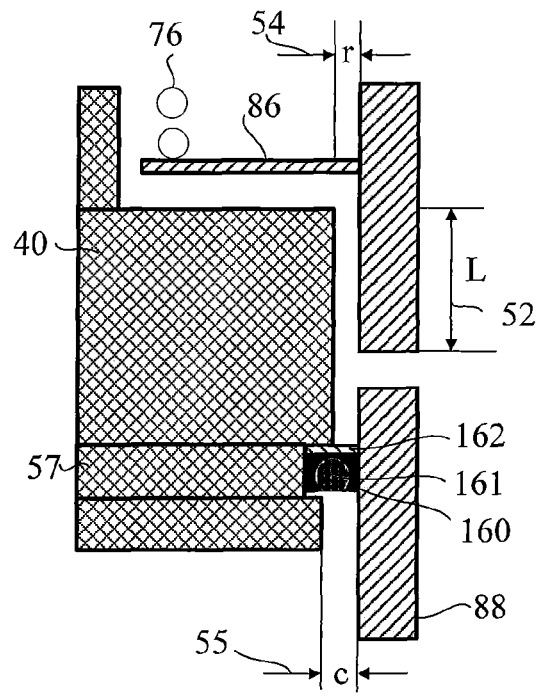
FIG. 7a illustrates a leakage preventing seal arrangement in a piston annular groove along with illustrating a match-fit predefined length (L) and predefined radial clearance (r).

FIG. 7a illustrates a seal arrangement employing piston annular groove 57 where a leakage preventing seal assembly, including lip or u-cup seal 160, energizer 161 and seal backup ring 162, is positioned to provide a leakage preventing seal 56 between piston cylindrical outer side wall 44 and inner circumferential surface 80 of housing 20. The lower extended portion of piston 40 may have a relaxed radial clearance 55 (denoted by "c") which is greater than pre-defined radial clearance 54 (denoted by "r") of the match-fit having predefined axial length 52 (denoted by "L").

Figure 7B:
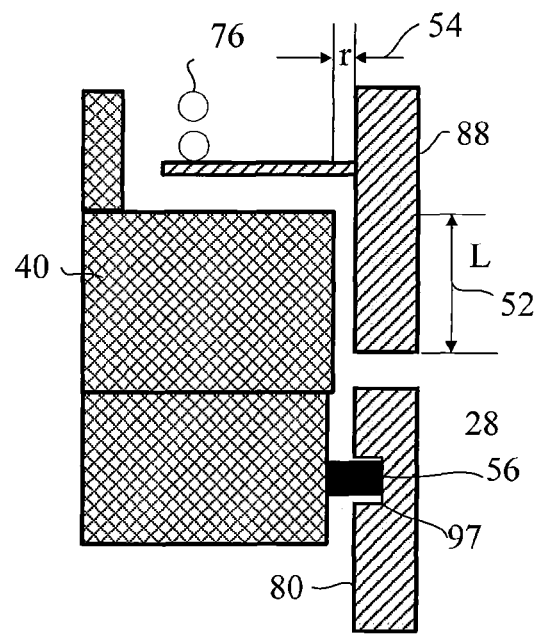
FIG. 7b illustrates a leakage preventing seal arrangement in a cylinder wall annular groove of the module housing.

In FIG. 7b, an alternative leakage preventing seal arrangement is illustrated where leakage preventing seal 56 is positioned in annular groove 97 of inner circumferential surface 80 of module housing 20.

Figure 7C:
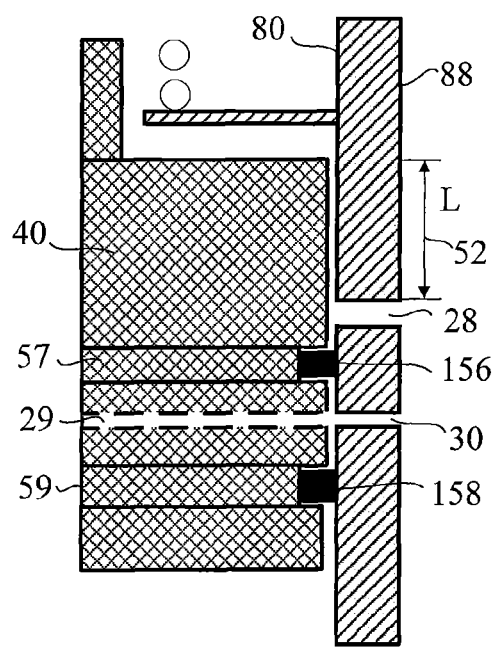
FIG. 7c illustrates a double leakage preventing seal arrangement in piston annular grooves.

FIG. 7c illustrates a combination seal arrangement with first leakage preventing seal 156 positioned in piston annular groove 57 between fluid weep orifice 30 and fluid leak orifice 28, and second leakage preventing seal 158 positioned in piston seal annular groove 59 between control fluid chamber 32 and weep orifice 30.

Figure 7D:
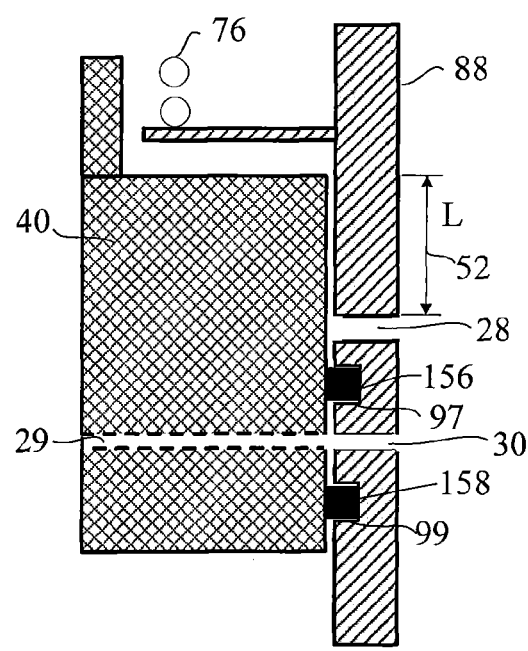
FIG. 7d illustrates a double leakage preventing seal arrangement in two cylinder wall annular grooves of the module housing.

In another alternate arrangement, FIG. 7d illustrates a combination seal arrangement where both first and second leakage preventing seals 156 and 158 are positioned in annular grooves 97 and 99, respectively, of inner circumferential surface 80 of module housing 20.

The bias of the pressure regulating module can be set based on desired end use system requirements. There are a number of factors which may be used to set a pressure bias in the pressure regulating module, including the flow properties of the fluids which, in operation, flow from high pressure fluid zones to lower pressure fluid zones. An air gap test can be used to determine the match-fit radial clearance distance between the two surfaces of the match-fit. This data along with the length of the match-fit is then used to determine a fluid flow rate from a high pressure fluid zone to a lower pressure fluid zone for specific fluids at defined temperatures and pressures. The bias for a particular system can then be determined for the particular pressure regulating module and for the particular fluids being supplied.

Additionally, a number of variables can be adjusted in regards to the match-fit depending on the desired end use system operation requirements when employing the pressure regulating modules disclosed herein. Dimensional variables including the diameter of piston 40, the diameter of cylinder bore 90, the match-fit radial clearance, and the length of the match-fit can be adjusted depending on the end use system requirements and the fluids being used. The graphs in FIGS. 8 and 9 illustrate the anticipated leakage along a match-fit with the reference fluid being diesel at a pressure of 35 MPa for different diameters, lengths and radial clearances based on the Hagen-Poiseuille equation.

$$Q = \frac{\pi d r_{clear}^3 \left(1 + \frac{3e^2}{2}\right)}{12\mu L} dp$$

The fluid leakage through the match-fit is primarily a function of match-fit length (L), piston diameter (d), match-fit radial clearance (r) and fluid viscosity ($\mu$). The eccentricity (e) is a parameter associated with how much the piston deviates from the cylinder bore central axis. If the piston is centered within the cylinder bore, then the eccentricity is zero and has no effect on the flow rate; however if the pressure regulating module is mounted on its side, for example, the eccentricity would then be taken into account when determining the flow rate. Lengthening and/or tightening by way of reducing the clearance of the match-fit, decreasing the diameter of the piston and keeping the pressure regulating module cool will also reduce fluid leakage along the match-fit. This will in turn minimize the impact on pump sizing required to maintain adequate flow in the system. For example, for an estimated diesel viscosity of 0.0011415 kg/ms at a typical engine operating temperature of 80 degrees Celsius and a density of 844 kg/m$^3$, a 50 mm diameter piston with a match-fit defined length of 40 mm and a diametral clearance of 6 $\mu$m (radial clearance being 3 $\mu$m or 0.003 mm) would have a leakage rate of approximately 0.82 kg/hr from housing 20 through fluid leak orifice 28. A 50 mm diameter piston with a match-fit length of 40 mm and a diametral clearance of 4 $\mu$m (radial clearance being 2 $\mu$m or 0.002 mm) would have a leakage rate of just under 0.25 kg/hr from housing 20 through fluid leak orifice 28. Fluid leak orifice 28 may be attached to a fluid supply return line for directing fluid back to the fluid supply reservoir or to an end use device such as an internal combustion engine, an after treatment system or an auxiliary power unit, by way of examples.

Figure 8:
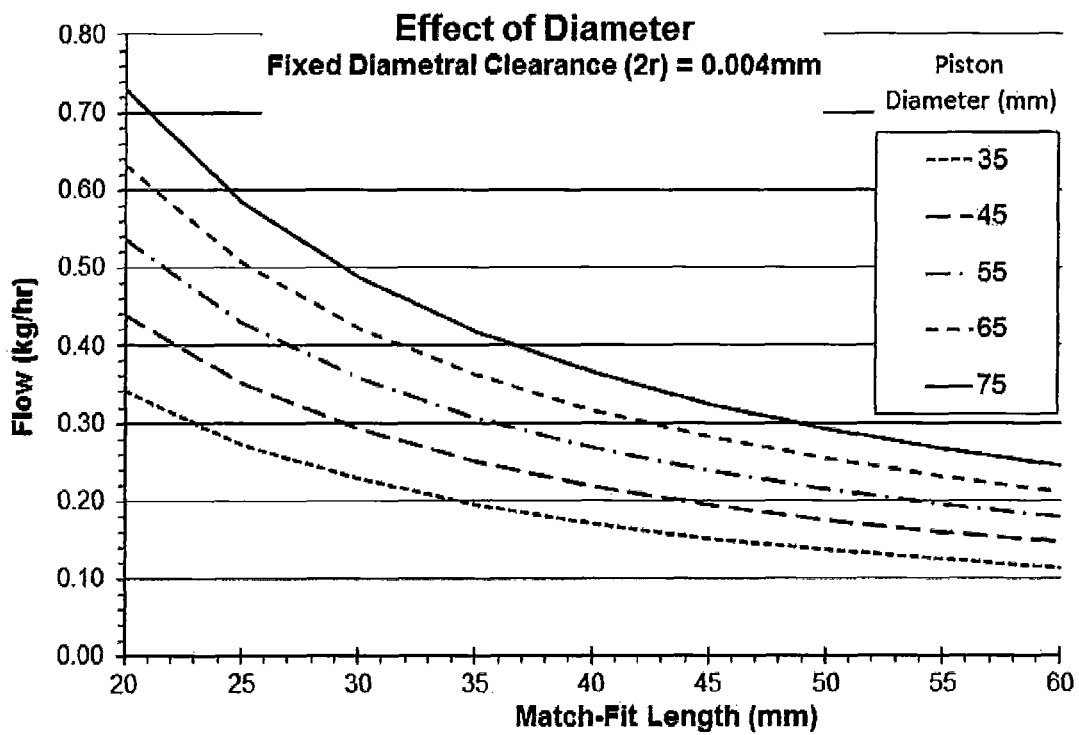
FIG. 8 is a graphical illustration showing the effect of piston diameter on the flow rate of diesel (axis of ordinates) past a match-fit having a predefined axial length (axis of abscissas) where the match-fit diametral clearance (2r) is fixed at 0.004 mm between the piston and cylinder wall.
Figure 9:
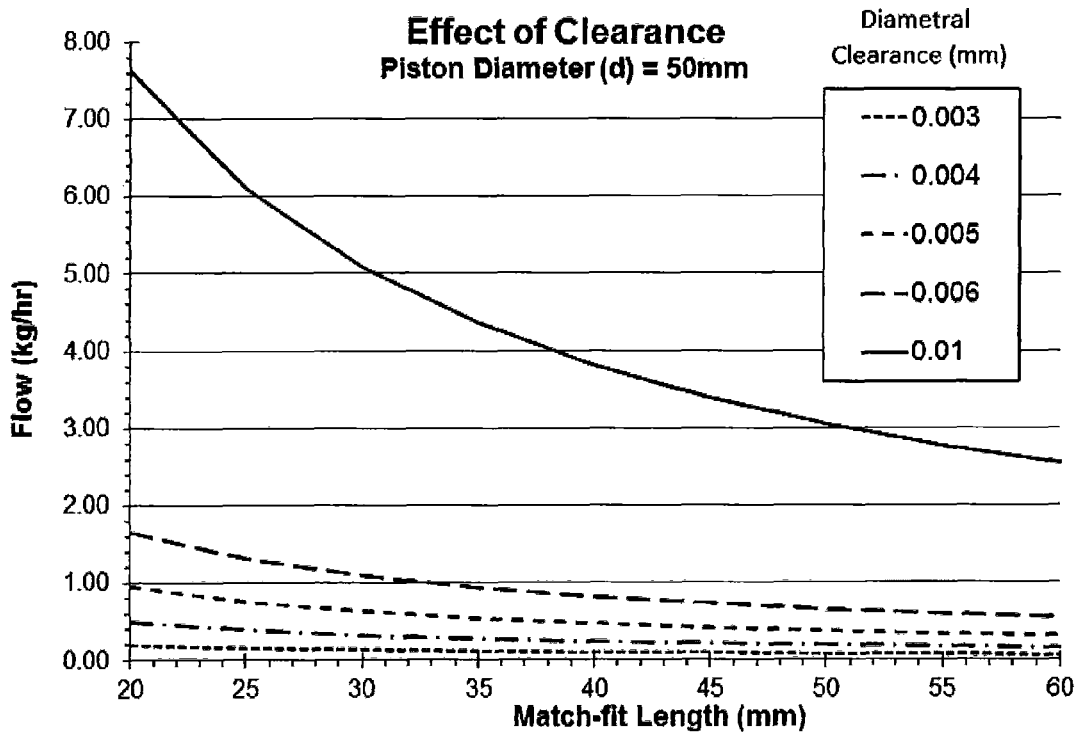
FIG. 9 is a graphical illustration showing the effect of the match-fit having a predefined diametral clearance (2r) on the flow rate of diesel (axis of ordinates) past a match-fit having a predefined axial length (axis of abscissas) where the piston diameter is fixed at 50 mm.

FIG. 8 is a graphical illustration showing the effect of piston diameter on the flow rate of diesel (axis of ordinates) past a match-fit length (axis of abscissas) where there is a match-fit diametral clearance of 0.004 mm (radial clearance being 2 $\mu$m or 0.002 mm) between the outer cylindrical wall of the piston and the inner circumferential surface of the housing. As the diameter of the piston increases for the same fixed clearance, the flow rate of the fluid increases. As the match-fit length increases the flow rate is reduced.

FIG. 9 is a graphical illustration showing the effect of the match-fit diametral clearance on the flow rate of diesel (axis of ordinates) past a match-fit length (axis of abscissas) where the piston is a fixed diameter of 50 mm. The graph shows the diametral clearance (2r) effect since that is typically used in engineering specifications rather than the radial clearance (r) effect. High flow rates are seen for a diametral clearance of 0.01 mm (solid line); however as the match-fit clearance is reduced to 0.003 mm (dashed line) the effect on flow rate reduction can be seen.

The pressure regulating modules described herein can be used in any end use device system where one fluid pressure needs to be controlled relative to another fluid pressure.

Another example of such a system would be in controlling the pressure of one fluid relative to another in blended slurry feeds in metal, ceramic, polymer, and/or composite systems where a leakage limiting fluid seal design with controlled leak paths is preferred to alternate system designs that may employ seals such as O-rings because of temperature, pressure and/or chemical incompatibilities with the system and system fluids.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A pressure regulating module comprising:
    a) a housing including a fluid inlet, a control fluid outlet, a reference fluid port, and at least a portion of the housing having an inner circumferential surface defining an axially extending cylinder bore, said cylinder bore being fluidly coupled to the fluid inlet on a first side of the housing and fluidly coupled to the reference fluid port on a second side of the housing;
    b) a pressure transfer assembly including a piston linked to a restricting element that controls flow of fluid from the fluid inlet to the control fluid outlet, said piston slidably disposed within the cylinder bore, said piston comprising a main body having a first face in communication with a control fluid chamber, a second face in communication with a reference fluid chamber, and a cylindrical outer side wall; said piston dimensioned to provide a predefined radial clearance between at least a portion of said outer side wall and said inner circumferential surface of the housing along a predefined axial length of said main body; and
    c) a fluid leak orifice extending from said inner circumferential surface of said housing to an exterior surface of said housing between said reference fluid chamber and said control fluid chamber;
    wherein said predefined radial clearance and predefined axial length are dimensioned to control the flow rate of fluid along a fluid communication passage formed between at least a portion of said piston and said inner circumferential surface from a high pressure fluid zone to a lower pressure fluid zone.

2. The pressure regulating module of claim 1, wherein said predefined radial clearance and said predefined axial length are dimensioned to limit fluid flow below a predetermined amount between said high pressure fluid zone and said lower pressure fluid zone.

3. The pressure regulating module of claim 1, wherein said predefined axial length extends substantially from said second face to said fluid leak orifice.

4. The pressure regulating module of claim 1, wherein said high pressure fluid zone is said control fluid chamber and said lower pressure fluid zone is said fluid leak orifice.

5. The pressure regulating module of claim 1, wherein said high pressure fluid zone is said reference fluid chamber and said lower pressure fluid zone is said fluid leak orifice.

6. The pressure regulating module of claim 1, further comprising a radial groove in substantial alignment with said fluid leak orifice to guide fluid flowing along said fluid communication passage from said high pressure fluid zone to said fluid leak orifice.

7. The pressure regulating module of claim 1, further comprising a leakage preventing seal disposed between said control fluid chamber and said fluid leak orifice to form a seal between the outer side wall of said piston and the inner circumferential surface of the housing.

8. The pressure regulating module of claim 7, further comprising a weep passage formed in said main body of said piston fluidly connecting said control fluid chamber to said fluid leak orifice.

9. The pressure regulating module of claim 1, further comprising a weep passage formed in said main body of said piston fluidly connecting said control fluid chamber to a weep orifice; said weep orifice extending from said inner circumferential surface to an exterior surface of said housing.

10. The pressure regulating module of claim 9, wherein said weep orifice is configured to be fluidly coupled to at least one of a drain circuit, a vent circuit, a fluid supply line for supplying fluid to one or more of a fluid supply reservoir, an after treatment system, an internal combustion engine, and an auxiliary power unit.

11. The pressure regulating module of claim 1, wherein said piston is dimensioned to provide a second predefined radial clearance between a second portion of said outer side wall and a second portion of said inner circumferential surface of the housing along a second predefined axial length; wherein said second predefined radial clearance and said second predefined axial length are dimensioned to control a flow rate of fluid along a second fluid communication passage formed between said piston and said second portion of said inner circumferential surface from a high pressure fluid zone to a lower pressure fluid zone.

12. The pressure regulating module of claim 1, wherein the predefined radial clearance is less than 0.05 mm.

13. The pressure regulating module of claim 1, wherein a pressure bias of 3 bar or greater is provided between a reference fluid chamber and said control fluid chamber.

14. The pressure regulating module of claim 1, wherein said pressure regulating module is disposed upstream of an internal combustion engine to control fluid pressure of a fuel directed to said internal combustion engine.

15. The pressure regulating module of claim 1, wherein reference fluid in said reference chamber and control fluid in said control chamber are substantially the same fluid.

16. The pressure regulating module of claim 1, wherein reference fluid in said reference chamber and control fluid in said control chamber have disparate viscosities.

17. The pressure regulating module of claim 1, wherein a gaseous fluid is employed as at least one of said control fluid and said reference fluid.

18. The pressure regulating module of claim 6, wherein said piston further comprises an upper extended portion having an outer side wall and an upper second face; said upper extended portion is in fluid communication with said fluid leak orifice through an upper drain orifice and is dimensioned to provide a second predefined radial clearance between at least a portion of said outer side wall and a second inner circumferential surface of said housing along a second predefined axial length; wherein said second predefined radial clearance and second predefined axial length are dimensioned to control a flow rate of fluid along a second fluid communication passage formed between said outer side wall and said second inner circumferential surface from high pressure fluid zone of said reference fluid chamber to lower pressure fluid zone of said upper drain orifice.

19. The pressure regulating module of claim 14, wherein a reference fluid in said reference chamber is a second fuel also directed to said internal combustion engine.

20. The pressure regulating module of claim 16, wherein a liquid is employed as said reference fluid and a gaseous fluid is employed as said control fluid.

\* \* \* \* \*